(12) United States Patent
Yang et al.

(10) Patent No.: US 9,275,610 B2
(45) Date of Patent: Mar. 1, 2016

(54) OBJECT TRACKING APPARATUS AND CONTROL METHOD THEREOF

(71) Applicants: Wen-Yu Yang, Hsin-Chu (TW);
Chia-Cheun Liang, Hsin-Chu (TW);
Chi-Yang Huang, Hsin-Chu (TW);
Han-Ping Cheng, Hsin-Chu (TW);
Ming-Tsan Kao, Hsin-Chu (TW)

(72) Inventors: Wen-Yu Yang, Hsin-Chu (TW);
Chia-Cheun Liang, Hsin-Chu (TW);
Chi-Yang Huang, Hsin-Chu (TW);
Han-Ping Cheng, Hsin-Chu (TW);
Ming-Tsan Kao, Hsin-Chu (TW)

(73) Assignee: PIXART IMAGING INCORPORATION, HSINCHU (TW)

( * ) Notice: Subject to any disclaimer, the term of this patent is extended or adjusted under 35 U.S.C. 154(b) by 309 days.

(21) Appl. No.: 14/011,494

(22) Filed: Aug. 27, 2013

(65) Prior Publication Data

US 2014/0071103 A1 Mar. 13, 2014

(30) Foreign Application Priority Data

Sep. 12, 2012 (TW) .............................. 101133228 A

(51) Int. Cl.
| | |
|---|---|
| *G09G 5/10* | (2006.01) |
| *G06K 9/20* | (2006.01) |
| *A63F 13/428* | (2014.01) |
| *A63F 13/24* | (2014.01) |
| *A63F 13/219* | (2014.01) |
| *A63F 13/213* | (2014.01) |

(52) U.S. Cl.
CPC ................ *G09G 5/10* (2013.01); *A63F 13/213* (2014.09); *A63F 13/219* (2014.09); *A63F 13/24* (2014.09); *A63F 13/428* (2014.09); *G06K 9/2027* (2013.01)

(58) Field of Classification Search
CPC . A63F 13/92; G06F 2221/2109; G06F 3/038; G06F 3/04847; G06F 3/0346; G06F 3/0325; G06F 3/0304
USPC ......... 345/156, 157, 158, 161; 463/36, 37, 38
See application file for complete search history.

(56) References Cited

U.S. PATENT DOCUMENTS

| | | | | |
|---|---|---|---|---|
| 2007/0218994 A1* | 9/2007 | Goto | .................. | A63F 13/06 463/36 |
| 2008/0117167 A1* | 5/2008 | Aonuma | ............... | G06F 3/0325 345/157 |
| 2008/0121782 A1* | 5/2008 | Hotelling | ............... | G08C 23/04 250/208.1 |
| 2013/0089334 A1* | 4/2013 | Lin | ................. | G08C 23/04 398/106 |

FOREIGN PATENT DOCUMENTS

TW 201030563 A1 8/2010

* cited by examiner

*Primary Examiner* — Koosha Sharifi-Tefreshi
(74) *Attorney, Agent, or Firm* — Tung & Associates

(57) ABSTRACT

The present invention discloses an object tracking apparatus including a reference object, an optical sensor and a controller. The reference object has a plurality of light emitting devices, for generating an optical signal. The optical sensor is for detecting the optical signal and generating an identification signal in response to the optical signal. The controller is for generating a control signal according to the identification signal and outputting the control signal to the reference object, thereby adaptively adjusting a light emitting number or light emitting intensity of the plurality of light emitting devices. The present invention discloses a method for controlling an object tracking apparatus.

14 Claims, 10 Drawing Sheets

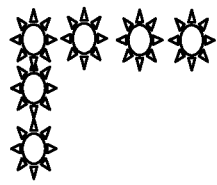
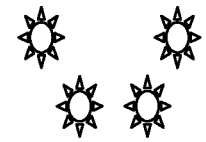
Fig. 4A  Fig. 4B
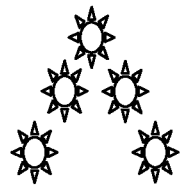
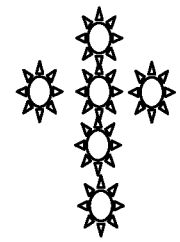
Fig. 4C  Fig. 4D

OBJECT TRACKING APPARATUS AND CONTROL METHOD THEREOF

CROSS REFERENCE

The present invention claims priority to TW 101133228, filed on Sep. 12, 2012.

BACKGROUND OF THE INVENTION

1. Field of Invention

The present invention relates to an object tracking apparatus and a control method of an object tracking apparatus; particularly, it relates to such object tracking apparatus and control method capable of adaptively adjusting an optical signal from a light emitting unit to reduce power consumption.

2. Description of Related Art

Electronic game apparatuses currently provide three-dimensional animation scenes with brilliant images and realistic sound effects. Players can enjoy real time interactive entertainment by controlling specific objects shown in the game. That is, the players can utilize an indexing device to control an object in the game, which is for example a role, and interact with the plot or even using high controlling skills to complete missions in the game. Generally, these electronic game apparatuses adopt an imaging sensor to capture an optical signal emitted from a reference point at a displaying end. In prior art, the reference point is formed by plural light emitting diodes with fixed number and intensity regardless of the relative distance between the image sensor and the reference point, and the plural light emitting diodes are arranged as a straight-line, so the intensity and the shape of the reference point always remain the same. Such conventional electronic game apparatuses consume power unnecessarily.

In view of the above, to overcome the drawback in the prior art, the present invention proposes an object tracking apparatus and a control method of the object tracking apparatus, which is capable of adaptively adjusting the light emitting intensity and the shape of the reference point, thereby greatly improving the accuracy to identify the reference point and the overall control quality.

SUMMARY OF THE INVENTION

A first objective of the present invention is to provide an object tracking apparatus.

A second objective of the present invention is to provide a control method of an object tracking apparatus.

To achieve the above and other objectives, from one perspective, the present invention provides an object tracking apparatus, comprising: a reference object having a plurality of light emitting devices, for generating an optical signal; an optical sensor for detecting the optical signal and generating an identification signal in response to the optical signal; and a controller for generating a control signal according to the identification signal and outputting the control signal to the reference object, thereby adaptively adjusting a light emitting number or light emitting intensity of the plurality of light emitting devices.

From another perspective, the present invention provides a control method of an object tracking apparatus, comprising: providing a reference object having a plurality of light emitting devices, for generating an optical signal; detecting the optical signal and generating an identification signal in response to the optical signal; and generating a control signal according to the identification signal and outputting the control signal to the reference object, thereby adaptively adjusting a light emitting number or light emitting intensity of the plurality of light emitting devices.

In one embodiment, the plurality of light emitting devices are arranged in a predetermined shape, wherein the predetermined shape does not repeat when is rotated by a rotation angle between 0 degree and 360 degrees except that the predetermined shape rotated at 360 degrees repeats the predetermined shape rotated at 0 degree.

In one embodiment, the plurality of light emitting devices are sequentially turned on at different timings to generate the optical signal.

In one embodiment, the optical signal includes a visible light signal, an infrared light signal or an electromagnetic wave signal.

In another embodiment, the object tracking apparatus further comprises a communication unit for transmitting the identification signal to the controller. The communication unit includes an infrared transmitting/receiving interface or a radio frequency transmitting/receiving interface.

In yet another embodiment, the controller generates angle information related to a relative angle rotation of the reference object with respect to the optical sensor or position information related to a relative position of the reference object with respect to the optical sensor.

In still another embodiment, the controller compares the identification signal with a predetermined reference basis to generate a comparison result and generates the control signal according to the comparison result.

In one embodiment, the control signal adjusts the light emitting number or the light emitting intensity of the plurality of light emitting devices, so that the plurality of light emitting devices which emit light form a predetermined shape. When the optical sensor fails to detect and recognize the predetermined shape, the control signal increases or decreases the light emitting number of the plurality of light emitting devices, and/or enhances or reduces the light emitting intensity of the plurality of light emitting devices.

The objectives, technical details, features, and effects of the present invention will be better understood with regard to the detailed description of the embodiments below and with reference to the attached drawings.

BRIEF DESCRIPTION OF THE DRAWINGS

FIG. 4A shows a shape of the reference object formed by an arrangement of the plural light emitting devices.

FIG. 4B shows another shape of the reference object formed by an arrangement of the plural light emitting devices.

FIG. 4C shows another shape of the reference object formed by an arrangement of the plural light emitting devices.

FIG. 4D shows another shape of the reference object formed by an arrangement of the plural light emitting devices.

DESCRIPTION OF THE PREFERRED EMBODIMENTS

Figure 1:
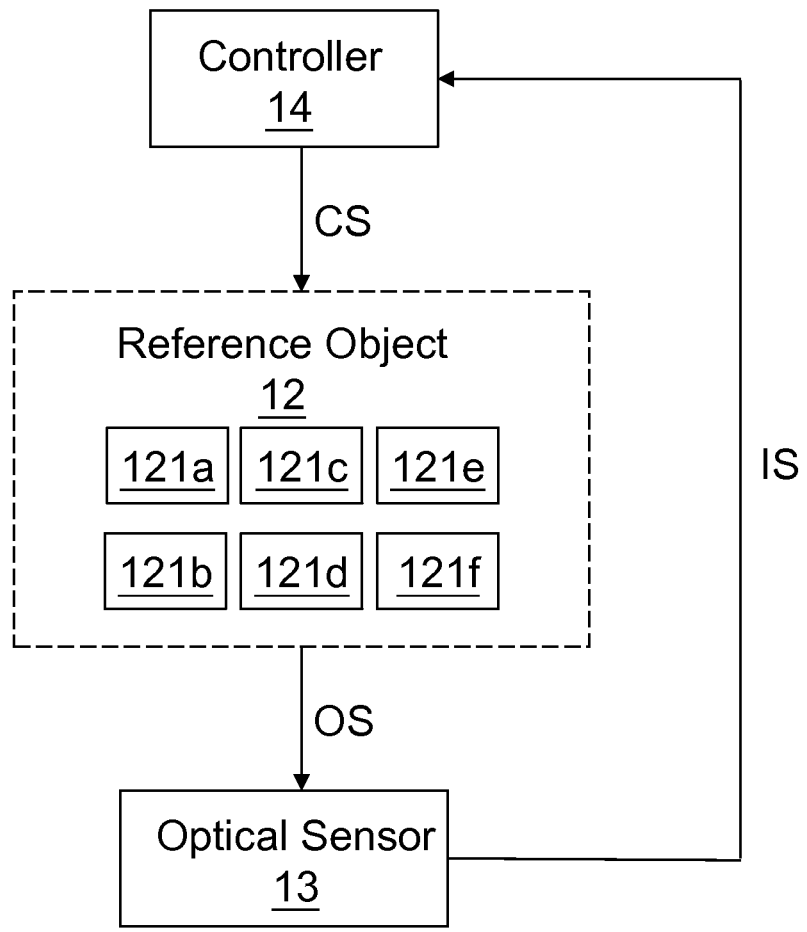
FIG. 1 shows a block diagram of an object tracking apparatus according to a first embodiment of the present invention.

Please refer to FIG. 1, which shows a block diagram of an object tracking apparatus according to a first embodiment of the present invention. The object tracking apparatus 100 of this embodiment comprises a reference object 12, an optical sensor 13 and a controller 14. The reference object 12 has, for example but not limited to, plural light emitting devices 121a, 121b, 121c, 121d, 121e and 121f, for generating an optical signal OS. The optical sensor 13 detects the optical signal OS and generates an identification signal IS in response to the optical signal OS. The identification signal IS can be generated by various approaches. For example, the image retrieved by the optical sensor 13 is composed of pixels with different brightness indices. In one embodiment, the pixels whose brightness is larger than a predetermined threshold can be selected and subjected to a predefined calculation to generate an identification signal IS. More specifically, the predefined calculation for example can be obtaining a center, a gravity center, a selected representative point of the periphery, a sum of brightness indices, or a weighted sum of brightness indices of the pixels whose brightness is larger than a predetermined threshold. Certainly, the predetermined threshold is not necessarily required, and the calculation to obtain a center, a gravity center, a selected representative point of the periphery, a sum or a weighted sum of brightness indices can be based on all pixels. It should be understood that the above-mentioned examples for generating the identification signal are for illustrative purpose, but not for limiting the scope of the present invention. Any method that can generate an identification signal IS relating to the size and the brightness of the image of the reference object 12 formed on the optical sensor 13 is within the scope of the present invention. The controller 14 is coupled to the reference object 12. The controller 14 generates a control signal CS according to the identification signal IS and outputs the control signal CS to the reference object 12, to adaptively adjust the optical signal OS. The optical signal OS can be, for example but not limited to, a visible light signal, an infrared light signal or an electromagnetic wave signal. In this embodiment, the optical signal OS is an invisible light signal such as an infrared light signal, and correspondingly, the light emitting devices 121a-121f are infrared light emitting diodes capable of emitting infrared light. However, in another embodiment wherein the optical signal OS is in another form (e.g., a visible light signal or an electromagnetic wave signal), the light emitting devices 121a-121f should be correspondingly modified to other suitable devices. As shown in FIG. 1, the reference object 12 of this embodiment has plural light emitting devices 121a-121f; the number of the light emitting devices can be varied according to practical needs. In this specific embodiment, the number of the light emitting devices 121a-121f is six. In addition, the control signal CS includes a signal defining the light emitting number and a signal defining the light emitting intensity. The signal defining the light emitting number defines the number of the light emitting devices that are turned-on. The signal defining the light emitting intensity defines the light emitting intensity of the turned-on light emitting devices. The optical sensor 13 is, for example but not limited to, an image sensor capable of capturing the image of the reference object 12, such as a CMOS image sensor or a CCD image sensor.

Figure 2:
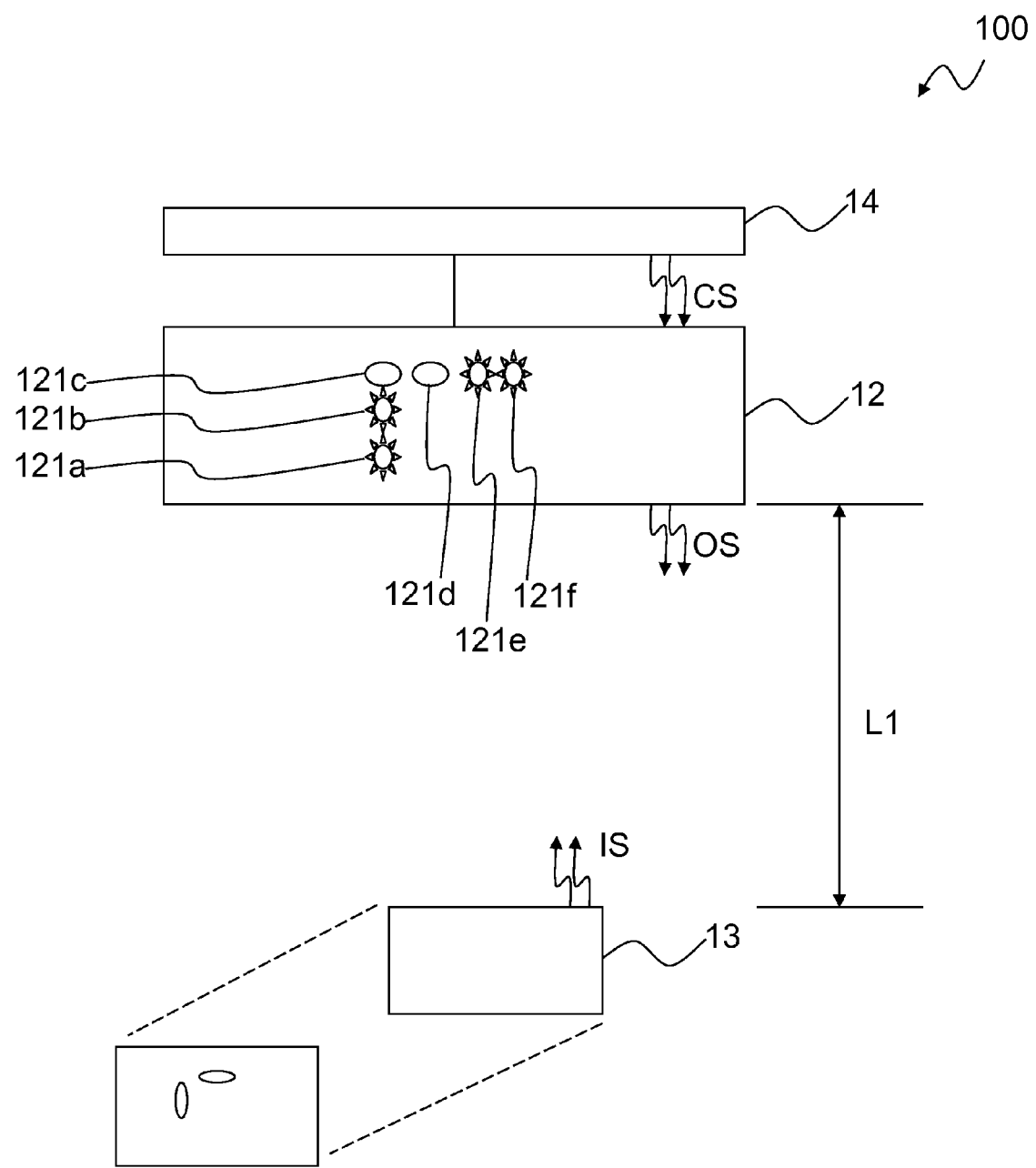
FIG. 2 shows a schematic view of an object tracking apparatus according to the first embodiment of the present invention.

Please refer to FIG. 2, which shows a schematic view of an object tracking apparatus according to the first embodiment of the present invention. As shown in FIG. 2, in normal operation, the relative distance between the reference object 12 and the optical sensor 13 is within a medium and preferable range, which is for example L1. Meanwhile in this embodiment, for example, the control signal CS enables four light emitting devices 121a, 121b, 121e and 121f to be turned on and two light emitting devices 121c and 121d to be turned off, and controls the light emitting intensity of each turned-on light emitting device 121a, 121b, 121e and 121f (e.g., to be a predetermined light emitting intensity). The optical signal OS generated by these four light emitting devices 121a, 121b, 121e and 121f is a signal having a combinational effect resulting from the light emitting number and light emitting intensity of these four light emitting devices 121a, 121b, 121e and 121f.

Figure 3A:
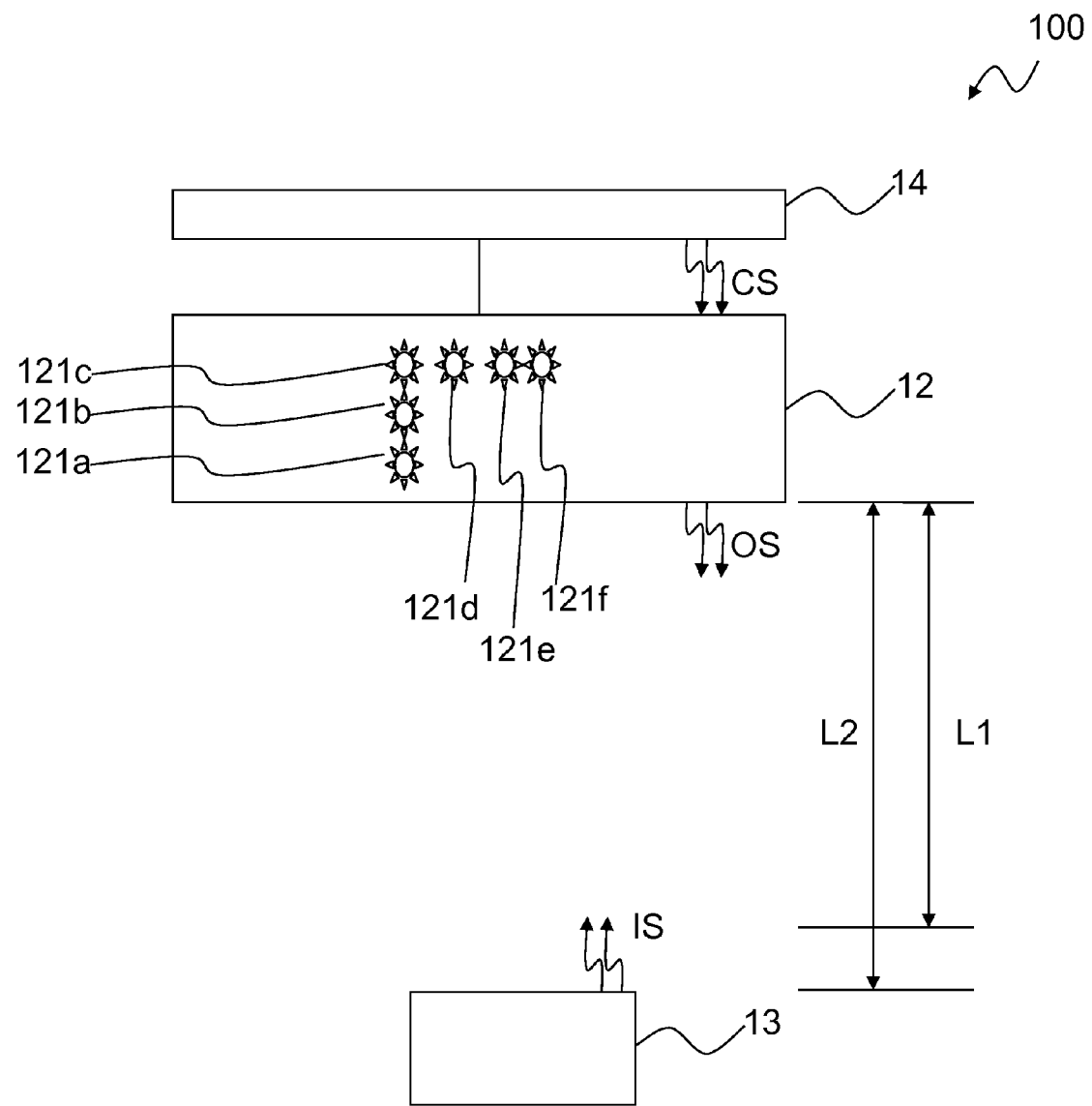
FIG. 3A illustrates that the object tracking apparatus of the first embodiment of the present invention adaptively adjusts the optical signal generated by the reference object.
Figure 3B:
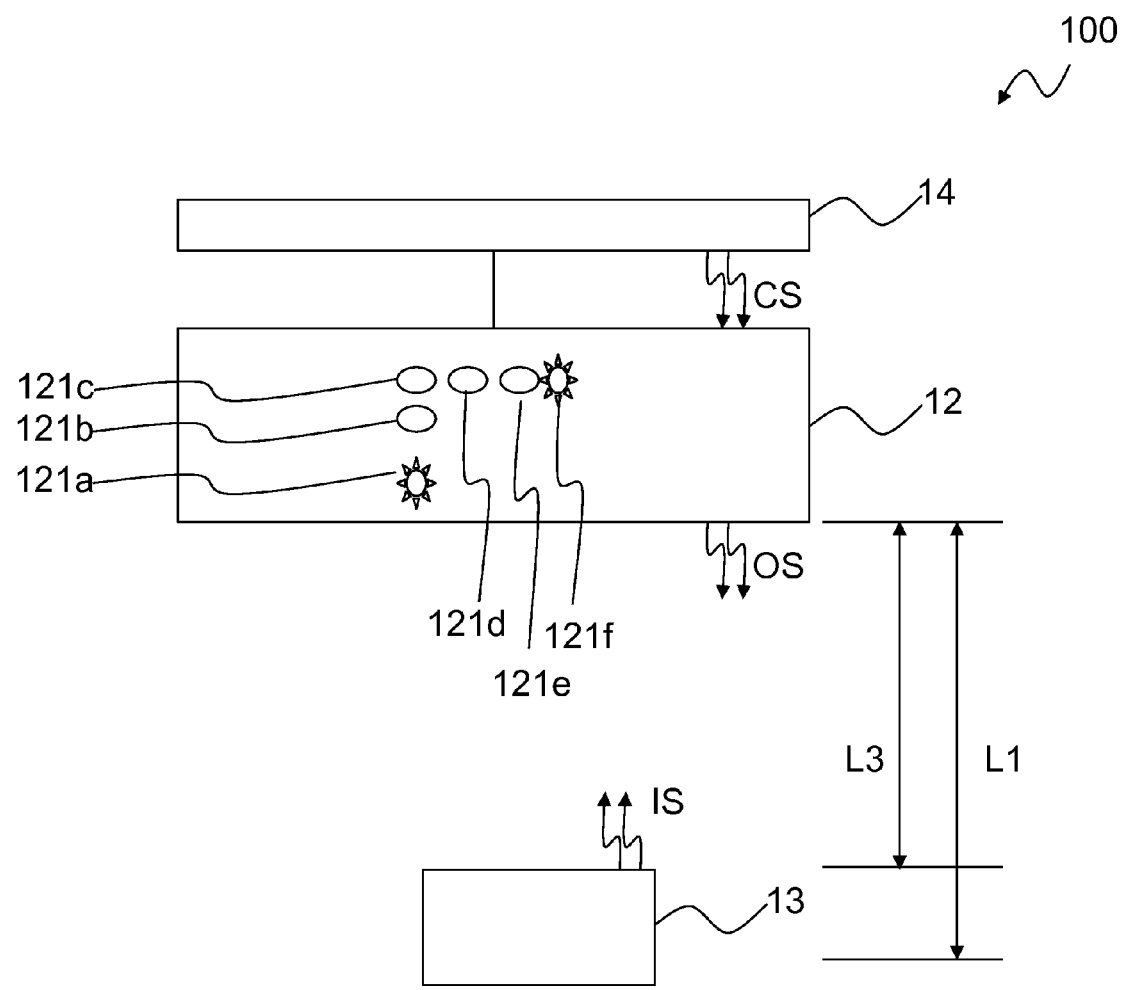
FIG. 3B illustrates that the object tracking apparatus of the first embodiment of the present invention adaptively adjusts the optical signal generated by the reference object.

Please refer to FIG. 2, FIG. 3A and FIG. 3B. FIGS. 3A-3B illustrate that the object tracking apparatus of the first embodiment of the present invention can adaptively adjust the optical signal generated by the reference object. As shown in FIG. 3A, the relative distance between the reference object 12 and the optical sensor 13 is, for example, L2, wherein L2 is greater than L1. In other words, the relative distance between the reference object 12 and the optical sensor 13 shown in FIG. 3A (i.e., the distance of L2) is longer than a medium and preferable range. The optical sensor 13 generates an identification signal IS in response to the optical signal OS. The obtained identification signal IS is related to the size and brightness of the image of the reference object 12 formed on the optical sensor 13. The controller 14 compares the identification signal IS with a predetermined reference basis to generate a comparison result. The predetermined reference basis is related to a preferred size range and a preferred brightness range for better identify the optical signal OS. The preferred size range and the preferred brightness range for example have an upper limit and a lower limit which can be designed according to practical needs. When the relative distance is L2, the size of the image of the reference object 12 formed on the optical sensor 13 is smaller and the brightness of the image of the reference object 12 formed on the optical sensor 13 is darker. As a consequence, the comparison result indicates that the identification signal IS is not in a preferred range (lower than the lower limit). In response to the comparison result, the controller 14 generates the control signal CS and outputs the control signal CS to the reference object 12, adjusting the optical signal OS to enhance it. The optical signal OS can be enhanced by increasing the light emitting number alone, that is to increase the number of the turned-on light emitting devices (for example from four to six, so that the six light emitting devices 121a-121f are all in turned-on state). Or, the optical signal OS can be enhanced by enhancing the light emitting intensity alone, that is to increase the light emitting intensity of each turned-on light emitting device 121a, 121b, 121e and 121f. Or, the optical signal OS can be enhanced by increasing both the number and the light emitting intensity.

As shown in FIG. 3B, the relative distance between the reference object 12 and the optical sensor 13 is, for example, L3, wherein L3 is shorter than L1. In other words, the relative distance between the reference object 12 and the optical sensor 13 shown in FIG. 3B (i.e., the distance of L3) is shorter than a medium and preferable range. The optical sensor 13 generates an identification signal IS in response to the optical signal OS. The obtained identification signal IS, as described previously, is related to the size and brightness of the image of the reference object 12 formed on the optical sensor 13. The controller 14 compares the identification signal IS with the above-mentioned predetermined reference basis to generate a comparison result. When the relative distance is L3, the size of the image of the reference object 12 formed on the optical sensor 13 is larger and the brightness of the image of the reference object 12 formed on the optical sensor 13 is brighter. As a consequence, the comparison result indicates that the identification signal IS is not in a preferred range (higher than the upper limit). In response to the comparison result, the controller 14 generates the control signal CS and outputs the control signal CS to the reference object 12, adjusting the optical signal OS to reduce it. The optical signal OS can be reduced by decreasing the light emitting number alone, that is to decrease the number of the turned-on light emitting devices (for example from four to two, so that only two light emitting devices 121a and 121f are in turned-on state). Or, the optical signal OS can be reduced by reducing the light emitting intensity alone, that is to reduce the light emitting intensity of each turned-on light emitting device 121a, 121b, 121e and 121f. Or, the optical signal OS can be reduced by decreasing both the light emitting number and the light emitting intensity.

The object tracking apparatus 100 of this embodiment adaptively enhances the optical signal OS generated by the reference object 12 when the relative distance between the reference object 12 and the optical sensor 13 is longer, thereby enhancing the signal intensity of the image of the reference object 12 formed on the optical sensor 13. On the other hand, when the relative distance between the reference object 12 and the optical sensor 13 is shorter, the object tracking apparatus 100 of this embodiment adaptively reduces the light emitting intensity of the optical signal OS generated by the reference object 12 or decreases the number of the turned-on light emitting devices, so that the reference object 12 consumes less power. In the conventional object tracking apparatus, the light emitting devices of the reference object are constantly turned on regardless of the relative distance between the reference object 12 and the optical sensor 13. In contrast, the object tracking apparatus 100 of this embodiment is capable of adaptively adjusting the light emitting number and/or the light emitting intensity of the light emitting devices in response to different relative distances between the reference object 12 and the optical sensor 13, thereby greatly improving the control quality of the reference object 12 and saving power.

Please refer to FIGS. 4A-4D, which show several examples of the shape of the reference object formed by the plural light emitting devices in different arrangements. That is, the reference object 12 includes plural light emitting devices, which are arranged to form a predetermined shape. The predetermined shape can be, for example but not limited to, the L-shape as shown in FIG. 4A, or the shapes as shown in FIGS. 4B-4D.

According to the present invention, preferably, the predetermined shape should have a feature that it does not repeat when it is rotated by any angle between 0 degree and 360 degrees except that the shape at 360 degrees repeats the shape at 0 degree. ("Repeat" means that a shape has at least two rotation states which present exactly the same orientation as one another so that one rotation state can not be distinguished from another by the orientation.) More specifically, for example, if the plural light emitting devices are arranged in a straight-line, than it repeats as it is rotated by an angle of 180 degrees; if the plural light emitting devices are arranged in a triangle shape, than it repeats as it is rotated by an angle of 120 or 240 degrees; if the plural light emitting devices are arranged in a square shape, than it repeats as it is rotated by an angle of 90, 180 or 270 degrees; if the plural light emitting devices are arranged in a circle shape, than it repeats as it is rotated by whatever angle. In contrast, when any of the shapes as shown in FIGS. 4A-4D is rotated by an angle between 0 degree and 360 degrees, it does not repeat (except that the shape at 360 degrees repeats the shape at 0 degree). The reason for such design is for better identifying the reference object 12, so that even though the coordinate system of the optical sensor 13 is rotated with respect to the reference object 12, the relative position and orientation (relative angle) of the reference object 12 with respect to the optical sensor 13 can still be identified.

Figure 5:
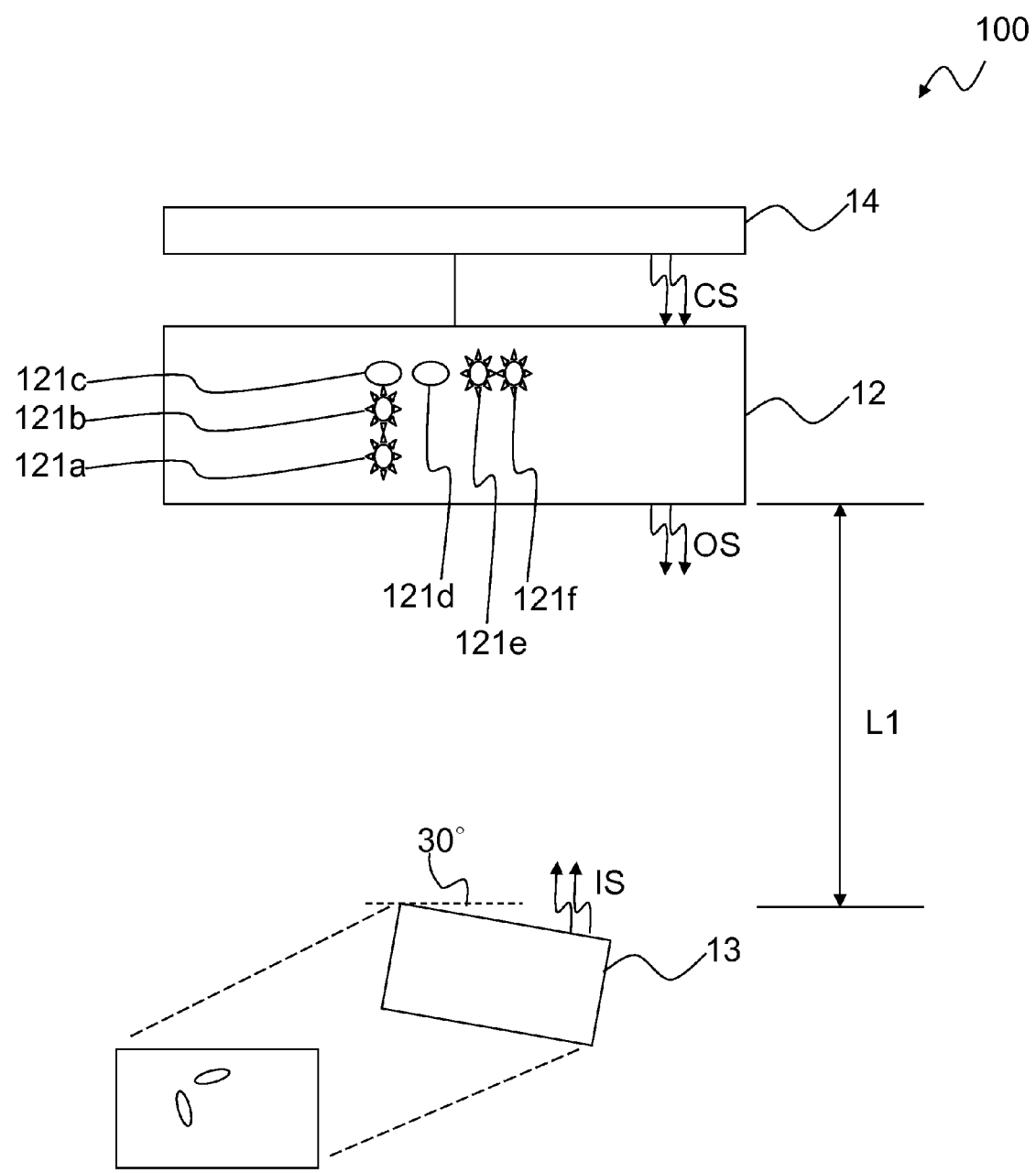
FIG. 5 illustrates that the optical sensor of the object tracking apparatus is rotated clockwise by 30 degrees.

Please refer to both FIG. 2 and FIG. 5. Whereas FIG. 2 illustrates that the optical sensor of the object tracking apparatus is rotated by 0 degree, FIG. 5 illustrates that the optical sensor of the object tracking apparatus is rotated clockwise by 30 degrees. In this embodiment, the six light emitting devices 121a-121f are arranged in an L shape; however, it should be understood that L shape is only an illustrative example and any other shape, such as but not limited to any one shown in FIGS. 4B-4D, can be used.

When operating the object tracking apparatus 100, the user may set up a basis angle between the optical sensor 13 and the reference object 12 in the beginning. For instance, in the beginning, the relative distance between the optical sensor 13 and the reference object 12 is L1 (which is within a preferable distance range), as shown in FIG. 2. Hence, four light emitting devices 121a, 121b, 121e and 121f of the reference object 12 are turned-on and the other two light emitting devices 121c and 121d are turned-off. Because the optical sensor 13 is not rotated with respect to the reference object 12, the image of the reference object 12 is formed on the optical sensor 13 as shown at the lower-left of FIG. 2. The optical sensor 13 generates the identification signal IS in response to the optical signal OS and the basis angle between the optical sensor 13 and the reference object 12 is defined accordingly.

If the optical sensor 13 is rotated clockwise by 30 degrees by the user as shown in FIG. 5, the image of the reference object 12 formed on the optical sensor 13 is changed, as shown at the lower-left of FIG. 5. The identification signal IS generated by the optical sensor 13 in FIG. 5 is different from that generated under no rotation in FIG. 2, and the difference corresponds to the angle information of a 30 degrees clockwise rotation. Hence, a relative angle rotation of the reference object 12 with respect to the optical sensor 13 can be obtained. It should be noted that in the beginning set up step, it is not necessary for the user to keep the optical sensor 13 unrotated with respect to the reference object 12; in fact, in the beginning, the optical sensor 13 can be rotated by any angle with respect to the reference object 12 according to the user's habit, and such rotation angle can be defined as the basis angle. Besides, in another embodiment, the basis angle relationship between the optical sensor 13 and the reference object 12 can be a predetermined value instead of being defined by the user through a set up step.

In addition to the angle information (rotation angle relative to the basis angle), the above-mentioned approach can be used to obtain position information relative to a basis position of the reference object 12, or relative to a basis distance between the reference object 12 and the optical sensor 13. Likewise, the basis position can be defined by the user through a set up step in the beginning or can be a predetermined value without being defined by the user.

As the reference object 12 has a predetermined shape (no matter whether this predetermined shape will or will not repeat after being rotated), if the optical sensor 13 fails to detect and recognize this predetermined shape, the control signal CS can be used to increase or to decrease the light emitting number of the plural light emitting devices, and/or to enhance or to reduce the light emitting intensity of the plural light emitting devices until the predetermined shape is recognized. It should be understood that the wording that "the optical sensor 13 fails to detect and recognize this predetermined shape" is a conceptual description, which includes situations such as but not limited to that "the optical sensor 13 fails to detect a recognizable shape", or "although the optical sensor 13 detects a recognizable shape, the controller 14 cannot calculate to identify the recognized shape to meet the predetermined shape".

Figure 6A:
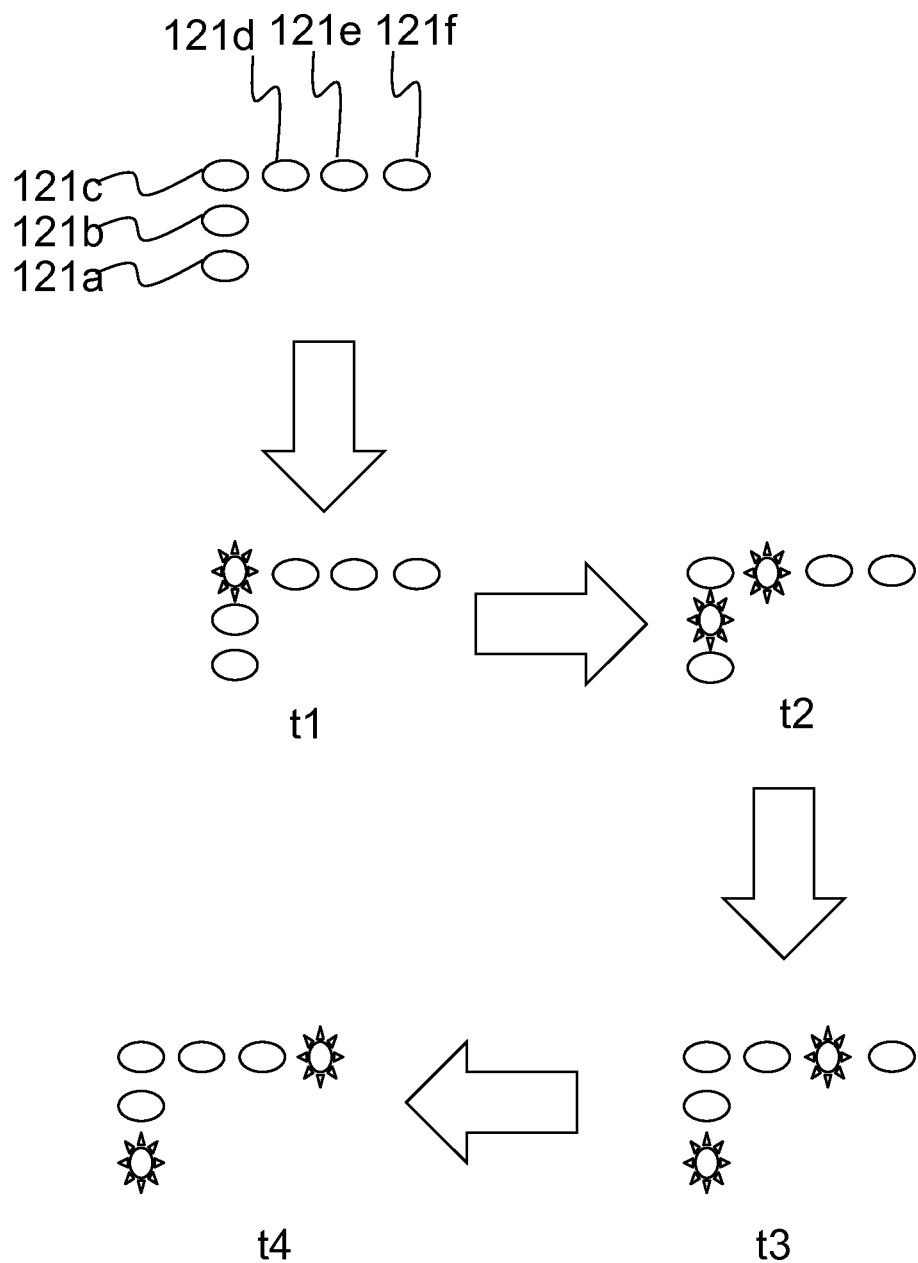
FIG. 6A illustrates that the plural light emitting devices of the reference object are sequentially turned on at different timings.

Please refer to FIG. 6A, which illustrates that the plural light emitting devices of the reference object of the present invention are sequentially turned on at different timings. The reference object 12 of this embodiment has, for example but not limited to, six light emitting devices 121a-121f, which are arranged in an L shape as shown in FIG. 5. These six light emitting devices 121a-121f can be sequentially turned on at different timings to generate the optical signal OS. For example, in the beginning, the six light emitting devices 121a-121f are all in the off state. At the time point of t1, the light emitting device 121c is turned on while the light emitting devices 121a, 121b, 121d, 121e and 121f are still off. At the time point of t2, the light emitting device 121b and 121d are turned on while the light emitting devices 121a, 121c, 121e and 121f are in the off state. At the time point of t3, the light emitting device 121a and 121e are turned on while the light emitting devices 121b, 121c, 121d and 121f are in the off state. At the time point of t4, the light emitting device 121a and 121f are turned on while the light emitting devices 121b, 121c, 121d and 121e are in the off state.

To sequentially turn on the plural light emitting devices at different timings provides several advantages as described below. First, the power consumption is reduced. Second, the overall light emitting intensity is adjustable. Third, the light emitting devices which emit light can be arranged to form various shapes, which facilitates the judgment as to whether the coordinate system of the optical sensor 13 is rotated with respect to the reference object 12. Fourth, the relative rotation of the optical sensor 13 with respect to the reference object 12 can be identified according to the sequentially turned-on timings. For example, assuming that the plural light emitting devices are arranged in a straight-line, when the straight-line is rotated by an angle of 180 degrees, the shape of the straight-line repeats the original shape as the straight-line is not rotated. However, the rotation can be identified if, for example, the plural light emitting devices arranged in the straight-line at the rotation angle of 0 degree are sequentially turned-on from the right-side to the left-side; thus, when the straight-line is rotated by 180 degrees, the plural light emitting devices will be sequentially turned-on from the left-side to the right-side, and the different turned-on sequence indicates the rotation. In other words, if the plural light emitting devices are sequentially turned on at different timings, then the shapes formed by the plural light emitting devices are not limited, even if it may repeat after being rotated.

Figure 6B:
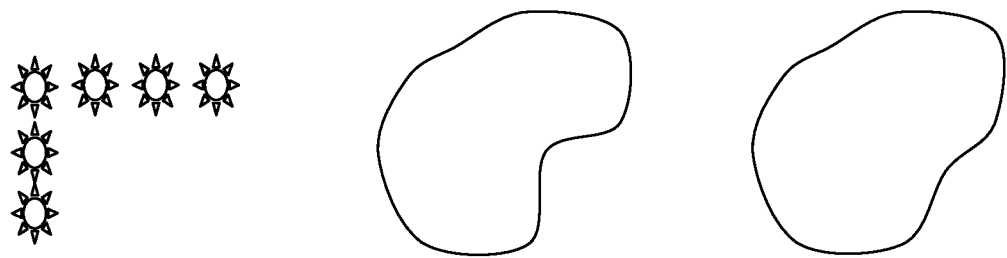
FIGS. 6B-6C illustrates that by sequentially turning on the light emitting devices at different timings the accuracy to identify the reference object is improved.
Figure 6C:
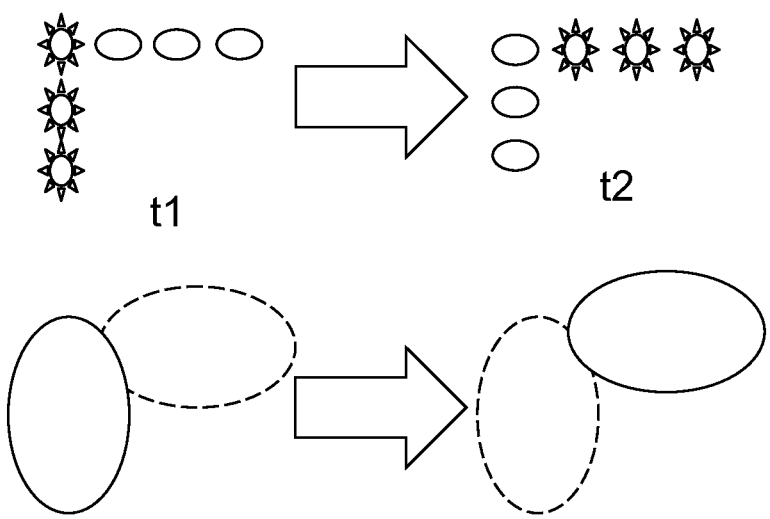

Please refer to FIGS. 6B-6C, which are another example illustrating that sequentially turning on the light emitting devices at different timings aids the recognition. The plural light emitting devices are arranged in, for example, the shape shown in FIG. 4A. Although this shape will not repeat after being rotated, if the noise level in the surrounding is high (e.g., the air is more humid and causes more reflection of light), the detected shape may be as shown in the middle of FIG. 6B, or even as shown at the right of FIG. 6B. Under this circumstance, although it is still possible to calculate the center, gravity center or representative point of the shape, the calculation to determine rotation is more difficult and there may be more errors. However, if the light emitting devices are sequentially turned-on by two groups, as shown by the time points of t1 and t2 in FIG. 6C, then the calculation becomes easier. In light of the above, the design of sequentially turning-on the light emitting devices can enhance identifying the rotation the reference object 12 and/or reduce the difficulty for calculation.

In prior art, the rotation angle is identified by an additional detecting device, such as a gyroscope or a gravity sensor. Such additional device is difficult to be integrated into a single-chip with the other circuits and it increases the manufacturing cost. The present invention identifies the rotation angle by the shape of the reference object or the turned-on timings of the light emitting devices, which does not require the additional detecting device and therefore is superior to the prior art.

Figure 7:
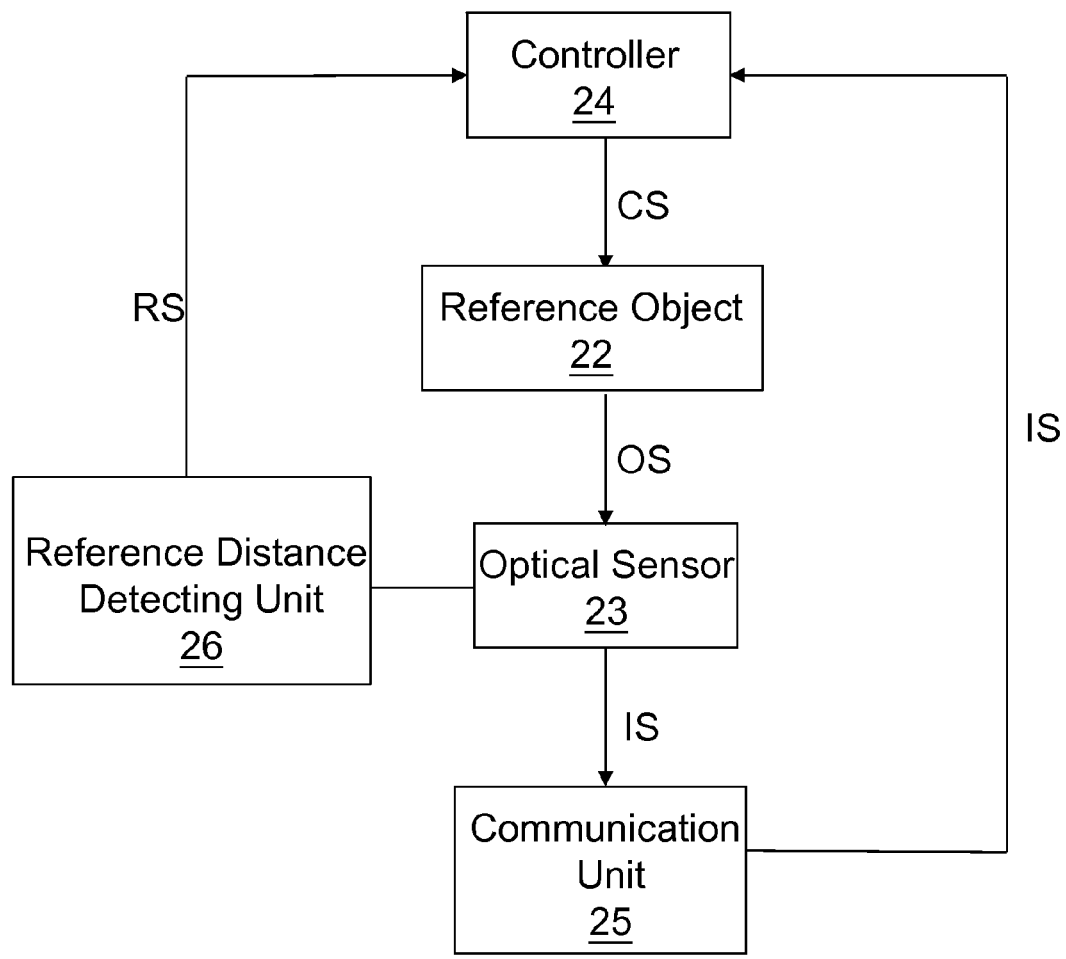
FIG. 7 shows a block diagram of an object tracking apparatus according to a second embodiment of the present invention.

Please refer to FIG. 7, which shows a block diagram of an object tracking apparatus according to a second embodiment of the present invention. The object tracking apparatus 200 of this embodiment is substantially the same as the object tracking apparatus 100 of the first embodiment, but is different in that the object tracking apparatus 200 of this embodiment further comprises a communication unit 25 and a reference distance detecting unit 26. The reference object 22, the optical sensor 23 and the controller 24 of this embodiment provide substantially the same functions as the above-mentioned reference object 12, the optical sensor 13 and the controller 14 do, and therefore they are not redundantly explained here.

The communication unit 25 is for transmitting the identification signal IS generated by the optical sensor to the controller 24. The communication unit 25 can be, for example, an infrared (IR) transmitting/receiving interface or a radio frequency (RF) transmitting/receiving interface, which transmits the identification signal IS to the controller 24. The identification signal IS is received by an infrared receiver (not shown) or a radio frequency receiver (not shown) coupled to the controller 24. In this embodiment, the communication unit 25 is shown for example as being coupled to the optical sensor 23. Certainly, in another embodiment, it is also practicable to couple the communication unit 25 to the controller 24.

Please still refer to FIG. 7. The reference distance detecting unit 26 is coupled to the optical sensor 23 and generates a reference distance signal RS according to the relative distance between the reference object 22 and the optical sensor 23. The reference distance signal RS is transmitted to the controller through wireless transmission. Notably, in this embodiment, the reference distance detecting unit 26 is shown for example as being coupled to the optical sensor 23. Certainly, in another embodiment, it is also practicable to couple the reference distance detecting unit 26 to the reference object 22 or the controller 24.

Figure 8:
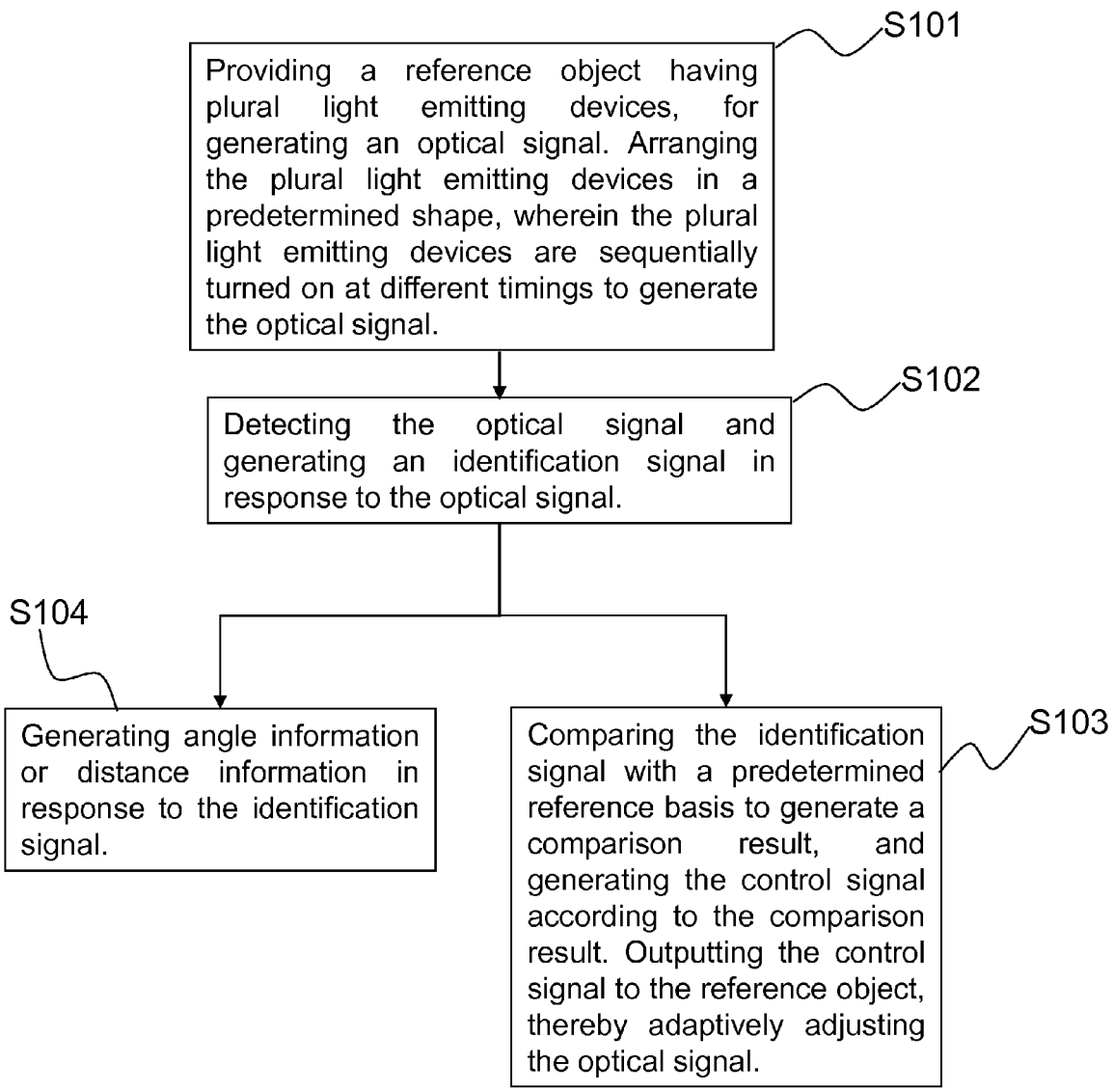
FIG. 8 shows a flowchart of a control method of the object tracking apparatus according to a third embodiment of the present invention.

Please refer to FIG. 8, which shows a flowchart of a control method of the object tracking apparatus according to a third embodiment of the present invention.

First, as shown in the step S101 of FIG. 8, the object tracking apparatus provides a reference object having plural light emitting devices, for generating an optical signal. Specifically, the optical signal can be, for example but not limited to, a visible light signal, an infrared light signal or an electromagnetic wave signal. The object tracking apparatus arranges the plural light emitting devices in a predetermined shape, wherein the plural light emitting devices are sequentially turned on at different timings to generate the optical signal.

Next, as shown in the step S102 of FIG. 8, the object tracking apparatus detects the optical signal and generates an identification signal in response to the optical signal.

Next, as shown in the step S103 of FIG. 8, the object tracking apparatus compares the identification signal with a predetermined reference basis to generate a comparison result, and generates the control signal according to the comparison result. The object tracking apparatus then outputs the control signal to the reference object, thereby adaptively adjusting the optical signal. Specifically, the optical signal can be adjusted by adjusting the light emitting number or light emitting intensity of the light emitting devices.

Alternatively, as shown in the step S104 of FIG. 8, the object tracking apparatus generates angle information or position information in response to the identification signal after the step S102.

The object tracking apparatus of the present invention is capable of adaptively adjusting the light emitting number and/or light emitting intensity of the light emitting devices when the relative distance between the reference object and the optical sensor changes, thereby greatly improving the control quality of the reference object and saving power. In addition, the object tracking apparatus is capable of detecting the relative rotation information between the reference object and the optical sensor, but does not require using an additional detecting device.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, it is not necessary for the reference object and the optical sensor to communicate with each other through wireless communication; they can communicate with each other through any approach. For another example, the reference distance detecting unit is not limited to transmitting the reference distance signal through wireless communication; it can transmit the signal through any approach. In view of the foregoing, the spirit of the present invention should cover all such and other modifications and variations, which should be interpreted to fall within the scope of the following claims and their equivalents.

What is claimed is:

1. An object tracking apparatus, comprising:
    a reference object having a plurality of light emitting devices, wherein the plurality of light emitting devices are sequentially turned on at different timings, for generating an optical signal;
    an optical sensor for detecting the optical signal and generating an identification signal in response to the optical signal; and
    a controller for generating a control signal according to the identification signal and outputting the control signal to the reference object, thereby adaptively adjusting a light emitting number or light emitting intensity of the plurality of light emitting devices;
    wherein, by sequentially turning on the plurality of light emitting devices at different timings, the plurality of light emitting devices form a different shape when the optical sensor and the reference object are relatively rotated with respect to each other at every different rotation angle, whereby the controller identifies a relative rotation between the optical sensor and the reference object.

2. The object tracking apparatus of claim 1, wherein the optical signal includes a visible light signal, an infrared light signal or an electromagnetic wave signal.

3. The object tracking apparatus of claim 1, further comprising:
    a communication unit for transmitting the identification signal to the controller.

4. The object tracking apparatus of claim 3, wherein the communication unit includes an infrared transmitting/receiving interface or a radio frequency transmitting/receiving interface.

5. The object tracking apparatus of claim 1, wherein the controller generates angle information related to a relative rotation angle of the reference object with respect to the optical sensor or position information related to a relative position of the reference object with respect to the optical sensor.

6. The object tracking apparatus of claim 1, wherein the controller compares the identification signal with a predetermined reference basis to generate a comparison result, and generates the control signal according to the comparison result.

7. The object tracking apparatus of claim 1, wherein the control signal adjusts the light emitting number or the light emitting intensity of the plurality of light emitting devices, so that the plurality of light emitting devices which emit light form a predetermined shape.

8. The object tracking apparatus of claim 7, wherein when the optical sensor fails to detect and recognize the predetermined shape, the control signal increases or decreases the light emitting number of the plurality of light emitting devices, and/or enhances or reduces the light emitting intensity of the plurality of light emitting devices.

9. A control method of an object tracking apparatus, comprising:
    providing a reference object having a plurality of light emitting devices, wherein the plurality of light emitting devices are sequentially turned on at different timings, for generating an optical signal, wherein, by sequentially turning on the plurality of light emitting devices at different timings, the plurality of light emitting devices form a sequence of shapes, and when the optical sensor and the reference object are relatively rotated with respect to each other, the sequence of shapes is different at every different rotation angle;
    detecting the optical signal by an optical sensor and generating an identification signal in response to the optical signal;
    generating a control signal according to the identification signal and outputting the control signal to the reference object, thereby adaptively adjusting a light emitting number or light emitting intensity of the plurality of light emitting devices; and
    identifying a relative rotation between the optical sensor and the reference object.

10. The control method of the object tracking apparatus of claim 9, wherein the optical signal includes a visible light signal, an infrared light signal or an electromagnetic wave signal.

11. The control method of the object tracking apparatus of claim 9, further comprising:
generating angle information or position information in response to the identification signal.

12. The control method of the object tracking apparatus of claim 9, wherein the step of generating the control signal according to the identification signal comprises:
comparing the identification signal with a predetermined reference basis so as to generate a comparison result, and generating the control signal according to the comparison result.

13. The control method of the object tracking apparatus of claim 9, wherein the control signal adjusts the light emitting number or the light emitting intensity of the plurality of light emitting devices, so that the plurality of light emitting devices which emit light form a predetermined shape.

14. The control method of the object tracking apparatus of claim 13, wherein when the optical signal fails to detect and recognize the predetermined shape, the control signal increases or decreases the light emitting number of the plurality of light emitting devices, and/or enhances or reduces the light emitting intensity of the plurality of light emitting devices.

* * * * *